No. 785,717. PATENTED MAR. 28, 1905.
A. P. CRISWELL.
AEROPLANE.
APPLICATION FILED DEC. 28, 1903.

2 SHEETS—SHEET 1.

Witnesses: Inventor:
Chas. E. Gaylord. Alexander P. Criswell,
John Enders. By Dyrenforth, Dyrenforth and Lee,
Att'ys.

No. 785,717. PATENTED MAR. 28, 1905.
A. P. CRISWELL.
AEROPLANE.
APPLICATION FILED DEC. 28, 1903.

2 SHEETS—SHEET 2.

Witnesses:
Carl C. Gaylord.
John Enders.

Inventor:
Alexander P. Criswell,
By Dyrenforth, Dyrenforth & Lee
Att'ys.

No. 785,717. Patented March 28, 1905.

UNITED STATES PATENT OFFICE.

ALEXANDER P. CRISWELL, OF CHICAGO, ILLINOIS.

AEROPLANE.

SPECIFICATION forming part of Letters Patent No. 785,717, dated March 28, 1905.

Application filed December 28, 1903. Serial No. 186,765.

*To all whom it may concern:*

Be it known that I, ALEXANDER P. CRISWELL, a citizen of the United States, residing at Chicago, in the county of Cook and State of Illinois, have invented a new and useful Improvement in Aeroplanes, of which the following is a specification.

My invention relates to improvements in the construction of frames for aeronautical machines or devices whether employed as kites, parachutes, or so-called "aeroplanes" or "flying-machines" and of a type in which a plurality of parallel or approximately parallel spaced layers, strata, or planes are presented to the buoyant action of air-currents.

My object is to provide an improved and particularly strong, light, and durable framework which will contribute toward rendering the structure peculiarly buoyant, swift, and easy to manage.

Figure 1:
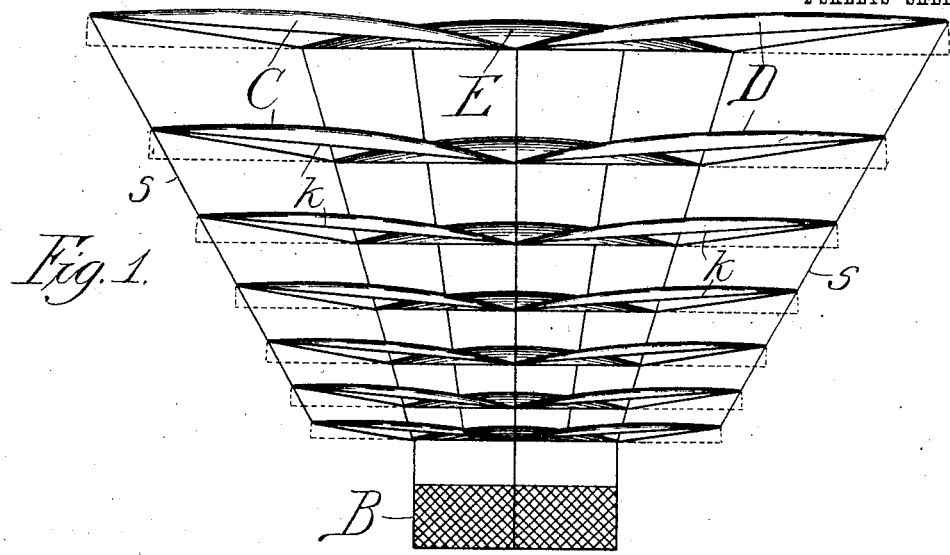
Figure 2:
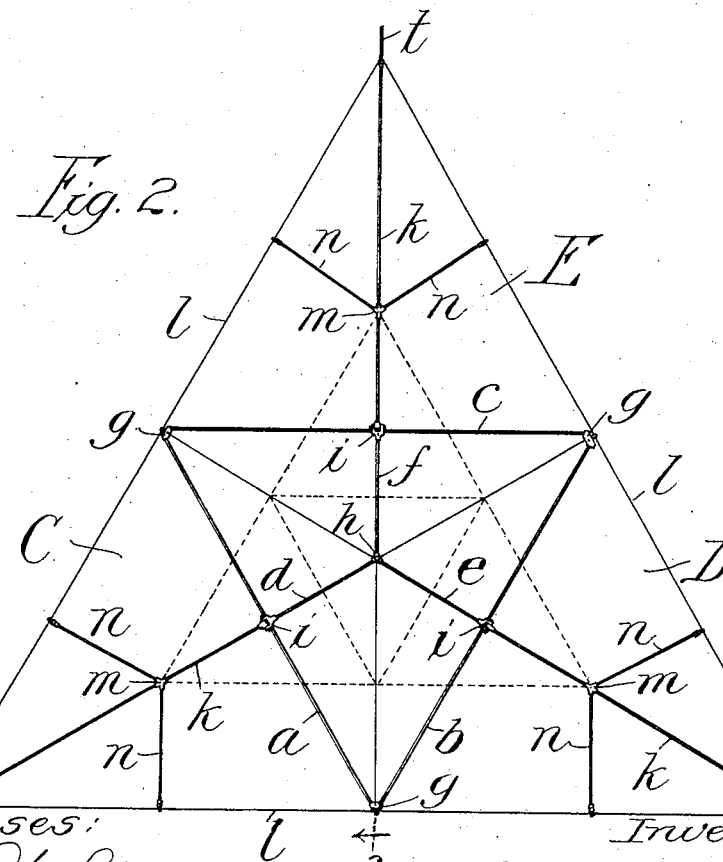
Figure 3:
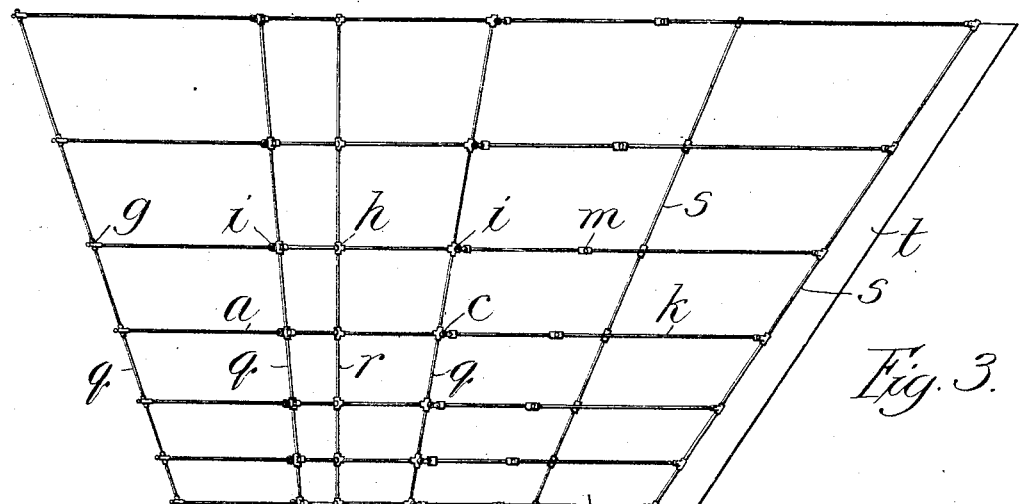
Figure 4:
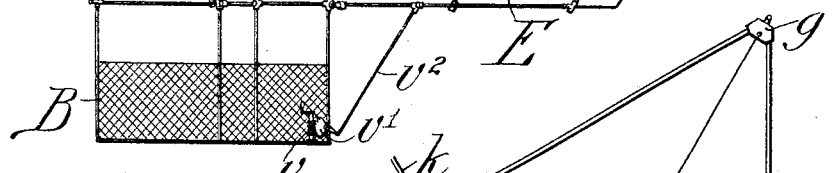
Figure 4:
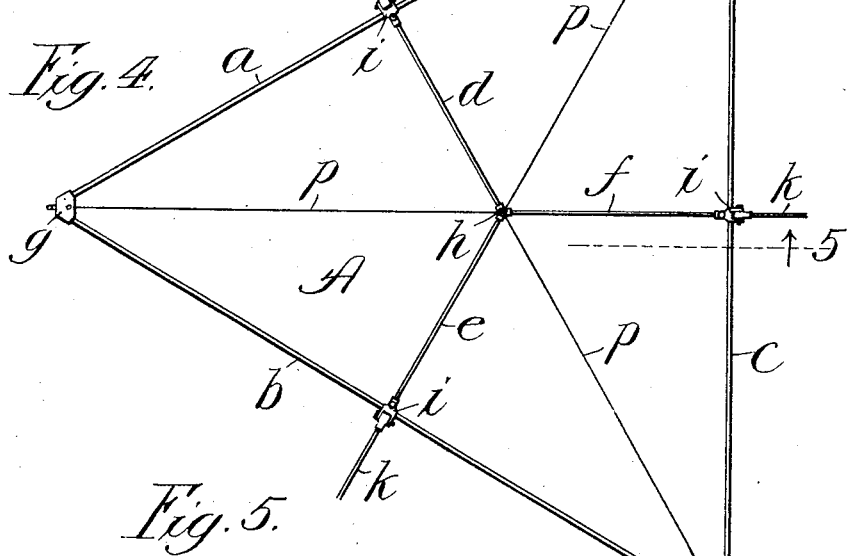
Figure 5:
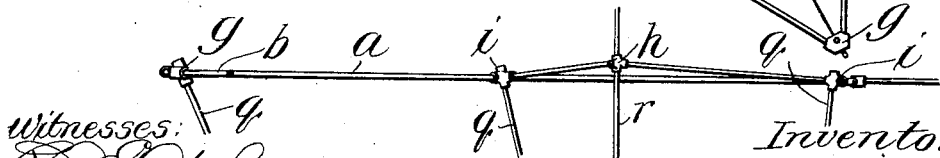

Referring to the drawings, Figure 1 is a view of my improved frame in elevation; Fig. 2, a top plan view of the same; Fig. 3, a section taken on line 3 in Fig. 2; Fig. 4, an enlarged broken plan view showing the wing-carrying triangular frame of a plane or stratum, and Fig. 5 a section taken on line 5 in Fig. 4.

The framework is formed with a central or body frame A, consisting of a series of plane-frames disposed one above another and having, preferably, three sides, approximating an equilateral triangle with one apex at the forward end. Each plane frame or stratum of the body-frame A consists of two side rods *a b*, rear rod *c*, and brace-rods *d e f*, extending, preferably, from approximately the centers of the rods *a b c* to a point within the triangle approximating, preferably, the center of a circle drawn through the apexes of the triangle. The ends of the rods *a b c* are held in rigid relation to each other by suitable couplings *g*, which may be formed with horizontal sockets at the proper relative angles to receive the said ends. The brace-rods *d e f* extend in a slightly upward-inclined direction from the rods *a b c* and are joined by a coupling *h*, which may be formed with three sockets at the proper relative angles to receive the ends of the brace-rods. The brace-rods are joined rigidly to the side rods by couplings *i*, which are in the form of tubes, through which the side rods pass, and have sockets to receive the ends of the brace-rods. Fastened to the side rods *a b c* are wing-rods *k*, extending in each instance, preferably, at a right angle to the side rod and hinged thereto at the respective coupling *i* to swing in the vertical plane. Where the body-frame is an equilateral triangle, the wing-rods *k*, extending from the side rods *a b*, may be of a length approximating that of the respective plane-frame portion of the frame A, whereby the free ends of the wing-rods will extend forward to the vertical plane of the forward apex of the respective body plane-frame. The rod *k*, extending from the rod *c*, may be of approximately the same length as the other rods *k*, whereby the ends of the tail and wing rods when the latter extend in the horizontal plane will form the apexes of an equilateral triangle drawn through the apexes of the body-frame plane-frames, as illustrated in Fig. 2. Extending around each plane and fastened to the ends of the rods *k* and to the couplings *g* is a brace *l* which may consist of poles or a rope, or both. On the rods *k* are couplings *m*, from which extend brace-rods *n*, fastened at their outer ends to the rope or the like *l*. The connection between the rods *n* and *k* is rigid. Extending from the coupling *h* to each coupling *g* is a preferably flexible brace *p*, which may be a rope or the like.

In the drawings I have shown a framework or structure formed with seven plane-frames constructed as described and of gradually-diminishing area from the upper to the lower thereof, with the couplings *h* of all the plane-frames in vertical line, and the said plane-frames are spaced apart at preferably gradually-diminishing distances from the top toward the bottom. Extending between the couplings *g i* of adjacent plane-frames are rods *q*, which brace the structure and space the plane-frames apart as desired. The rods *q* are rigidly secured to the said couplings, and the couplings *h* are similarly connected by brace-rods *r*. The ends of the wing-rods *k* and brace-rods *n* are also connected with the ends of the corresponding rods above and below them by means of ropes or other preferably flexible connections *s*. Hinged to the ends of the tail-rods *k*, extending from the rods *c*, is a rudder *t*, and suspended from the lowest and therefore smallest frame A is a basket or car B.

Each stratum of the structure would in practice be provided throughout with a sheet C or sheet-sections of silk, canvas, or other suitable material, attached at its edges to the stay or rope *l* and to the body-frame to bear at its upper surface against the under surface of the respective plane-frame. Thus the structure in its entirety presents a series of spaced parallel plane-frame members forming together the central triangular downwardly-tapering body portion and a corresponding number of laterally-extending wing plane-frames C D and tail or rear wing plane-frames E. The entire body portion, consisting of its graduated members or plane-frames, is a rigidly-braced integral structure and each of the three wing structures, consisting of their graduated plane-frames, is, in effect, an integral structure hinged at each of its planes to the corresponding plane of the body portion.

All the planes of each wing may be raised or lowered to a limited extent on their hinges to extend horizontally with or at an angle to the body portion.

In the case of a flying-machine where the lateral wings are intended to be moved up and down at frequent intervals the forward braces *n* thereof may extend in a downward-inclined direction from the poles *k*, while the rear braces *n* may extend in the same horizontal planes as said poles. Thus in their downward movement the wings will tend to raise and also propel the machine forward.

In Fig. 3 I have shown a means for changing the angle of the tail E, which means comprises a worm *v*, mounted in the car, with a crank for turning it, a segment-gear *v'*, meshing with the worm, and a rod *v²*, extending from an arm of the segment-gear and fastened to the lowermost rod *k* of the tail-wing. Turning of the rod *v* will thus move the lower rod *k* on its pivot and, through the connections with the other layers, move the same simultaneously, so that the entire wing structure may be positioned at any angle, as desired. The same or other desirable means may be provided for raising and lowering the lateral wings in the same way or at frequent intervals. Obviously the upward-extending brace rods or stays of the wing-frames should be so connected with the rods *k* as to permit more or less slight changes of angle between them.

The air-currents upon which the aeroplane depends for buoyancy move, as is well understood, substantially horizontal with respect to the earth's surface, and the aeroplane should be capable of being held with its overlying plane-surfaces in a position at the desired angles to the horizontal plane to receive the full buoyant action of the air-current on its entire area. To receive this full action the uppermost and largest plane should be not less than a certain distance, dependent upon its length from the plane next beneath it, and the distances may be varied according to the lengths of the planes. It is desirable that a structure of this class shall be as strong as possible consistent with lightness and shall be no larger for that and other reasons than necessary. Therefore by spacing the planes apart more or less according to their lengths the same buoyancy may be attained with a much shallower structure than if all the planes were spaced the distance apart necessary for the longest plane. As illustrated in the drawings, for example, the framework is only approximately two-thirds as high as it would be if all the spaces between planes were the same as the space between the two upper planes, while the area of sustaining-surface is much greater for a given height.

By providing a body portion, as described, with lateral forward-extending wings at obtuse angles to each other and stretching in a substantially straight plane at the forward end the aeroplane is well balanced and substantially free from danger of upsetting. By raising or lowering the lateral wings, according to changes in direction of the air-current, the aeroplane may be rendered free from danger of upsetting under any conditions of air-current.

The upward or downward movement of the aeroplane in its progress may be governed by change of angle of the tail-planes and any desired means may be employed for turning the rudder. The aeroplane may be rendered self propelling and sustaining by any suitable propelling means which will give to it a forward motion.

My present invention deals altogether with the structure of the framework, and while I prefer to provide the same throughout as shown and described this construction may be variously modified in the matter of details without departing from the spirit of my invention as defined by the claims. It is to be understood, of course, that the materials from which the framework is constructed should be those which will contribute the greatest possible strength consistent with lightness.

What I claim as new, and desire to secure by Letters Patent, is—

1. A frame for an aeronautical device having a body-frame portion, formed of approximately triangular and parallel skeleton plane-frames disposed one above another and spaced apart in substantially rigid relation, and approximately triangular skeleton wing-frames hinged thereto, substantially as and for the purpose set forth.

2. A frame for an aeronautical device having a body-frame portion formed of parallel skeleton plane-frames, disposed one above another and spaced apart in substantially rigid relation, and skeleton wing-plane frames hinged to three sides of each of said body-plane frames and spaced apart, the plane-frames of each of the wings being connected to move together, substantially as and for the purpose set forth.

3. In a frame for an aeronautical device, a body-frame consisting of a series of braced and parallel skeleton plane-frames disposed one above another and spaced apart in rigid relation, and gradually diminishing in length from the top to the bottom of the series, with correspondingly-diminishing spaces between them, substantially as and for the purpose set forth.

4. In a frame for an aeronautical device, a body-frame consisting of a series of braced and skeleton plane-frames disposed one above another and spaced apart in rigid relation, and gradually diminishing in length from the top to the bottom of the series with correspondingly-diminishing spaces between them, and wing-frames, secured to said body-frame, and consisting each of a corresponding series of skeleton plane-frames connected to move together, substantially as and for the purpose set forth.

5. In a frame for an aeronautical device, a body-frame consisting of a series of braced and parallel skeleton frames of approximately triangular shape disposed one above another, spaced apart in rigid relation and gradually diminishing in length from the top to the bottom of the series, with correspondingly-diminishing spaces between them, and wing-frames comprising series of plane-frames pivotally secured to said body plane-frames, substantially as and for the purpose set forth.

6. In a frame for an aeronautical device, a body-frame consisting of a series of braced and parallel skeleton plane-frames disposed one above another and spaced apart in substantially rigid relation, a car suspended from the lower said plane-frame, wings each formed of spaced and parallel plane-frames connected to move together and hinged to said body plane-frames, and means upon the car for raising and lowering said wings, substantially as and for the purpose set forth.

ALEXANDER P. CRISWELL.

In presence of—
   F. M. WIRTZ,
   WALTER N. WINBERG.